United States Patent
Im et al.

(10) Patent No.: US 10,868,323 B2
(45) Date of Patent: Dec. 15, 2020

(54) SOLID OXIDE FUEL CELL

(71) Applicant: LG CHEM, LTD., Seoul (KR)

(72) Inventors: Sanghyeok Im, Daejeon (KR); Yeonhyuk Heo, Daejeon (KR); Tai Min Noh, Daejeon (KR); Kwangyeon Park, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 44 days.

(21) Appl. No.: 16/301,953

(22) PCT Filed: Aug. 16, 2017

(86) PCT No.: PCT/KR2017/008899
§ 371 (c)(1),
(2) Date: Nov. 15, 2018

(87) PCT Pub. No.: WO2018/034490
PCT Pub. Date: Feb. 22, 2018

(65) Prior Publication Data
US 2019/0148757 A1    May 16, 2019

(30) Foreign Application Priority Data
Aug. 16, 2016 (KR) .................. 10-2016-0103733

(51) Int. Cl.
*H01M 8/1226* (2016.01)
*H01M 8/2483* (2016.01)
(Continued)

(52) U.S. Cl.
CPC ....... *H01M 8/1226* (2013.01); *H01M 8/0215* (2013.01); *H01M 8/0273* (2013.01);
(Continued)

(58) Field of Classification Search
CPC ............. H01M 8/1226; H01M 8/2483; H01M 8/0215; H01M 8/0273; H01M 8/0276;
(Continued)

(56) References Cited

U.S. PATENT DOCUMENTS 8,691,474 B2   4/2014   Armstrong et al.
8,962,202 B2   2/2015   Chung
(Continued)

FOREIGN PATENT DOCUMENTS

EP    1 933 410 A1    6/2008
JP    5-41224 A        2/1993
(Continued)

OTHER PUBLICATIONS

EPO machine generated English translation of JP-2013051128-A (Year: 2013).*

(Continued)

*Primary Examiner* — Christopher P Domone
*Assistant Examiner* — Kimberly Wyluda
(74) *Attorney, Agent, or Firm* — Birch, Stewart, Kolasch & Birch LLP

(57) ABSTRACT

A solid oxide fuel cell, and more particularly, a thin and light solid oxide fuel cell has a sealant layer in which a passage through which fuel and air may flow in and out. A support is located on an inner wall of the passage to prevent the blockage of the passage due to flow generated in the sealant layer at a high temperature. A window frame is omitted to simplify a configuration.

11 Claims, 3 Drawing Sheets

(51) Int. Cl.
*H01M 8/0215* (2016.01)
*H01M 8/2485* (2016.01)
*H01M 8/0276* (2016.01)
*H01M 8/0273* (2016.01)
*H01M 8/2432* (2016.01)
*H01M 8/124* (2016.01)
*H01M 8/0282* (2016.01)

(52) U.S. Cl.
CPC ....... *H01M 8/0276* (2013.01); *H01M 8/2483* (2016.02); *H01M 8/2485* (2013.01); *H01M 8/0282* (2013.01); *H01M 8/2432* (2016.02); *H01M 2008/1293* (2013.01)

(58) Field of Classification Search
CPC ............. H01M 8/2485; H01M 8/2432; H01M 8/0282; H01M 2008/1293
See application file for complete search history.

(56) References Cited

U.S. PATENT DOCUMENTS

| | | |
|---|---|---|
| 9,680,164 B2 | 6/2017 | Choi et al. |
| 10,008,732 B2 | 6/2018 | Choi et al. |
| 2002/0024185 A1 | 2/2002 | Ghosh et al. |
| 2006/0019813 A1 | 1/2006 | Yoshii |
| 2006/0188649 A1* | 8/2006 | Qi .................... H01M 8/0286 427/115 |
| 2008/0199738 A1 | 8/2008 | Perry et al. |
| 2012/0178012 A1 | 7/2012 | Min et al. |
| 2013/0130144 A1 | 5/2013 | Todo et al. |
| 2015/0024299 A1 | 1/2015 | Yu et al. |
| 2016/0372778 A1 | 12/2016 | Hotta et al. |

FOREIGN PATENT DOCUMENTS

| | | |
|---|---|---|
| JP | 10-92450 A | 4/1998 |
| JP | 2004-506308 A | 2/2004 |
| JP | 2005-294153 A | 10/2005 |
| JP | 2013-51128 A | 3/2013 |
| JP | 2013051128 A * | 3/2013 |
| JP | 2013-157243 A | 8/2013 |
| JP | 2015-156352 A | 8/2015 |
| KR | 10-1151868 B1 | 5/2012 |
| KR | 10-2012-0081780 A | 7/2012 |
| KR | 10-1161992 B1 | 7/2012 |
| KR | 10-1162669 B1 | 7/2012 |
| KR | 10-1237735 B1 | 2/2013 |
| KR | 10-2013-0137795 A | 12/2013 |
| KR | 10-2014-0087273 A | 7/2014 |
| KR | 10-2015-0001402 A | 1/2015 |

OTHER PUBLICATIONS

EPO machine generated English translation of JP-2005294153-A (Year: 2005).*
Definition of "ring shaped" (Year: 2004).*
International Search Report (PCT/ISA/210) issued in PCT/KR2017/008899, dated Nov. 27, 2017.
Extended European Search Report for European Application No. 17841672.3, dated May 17, 2019.

* cited by examiner

[Figure 1]
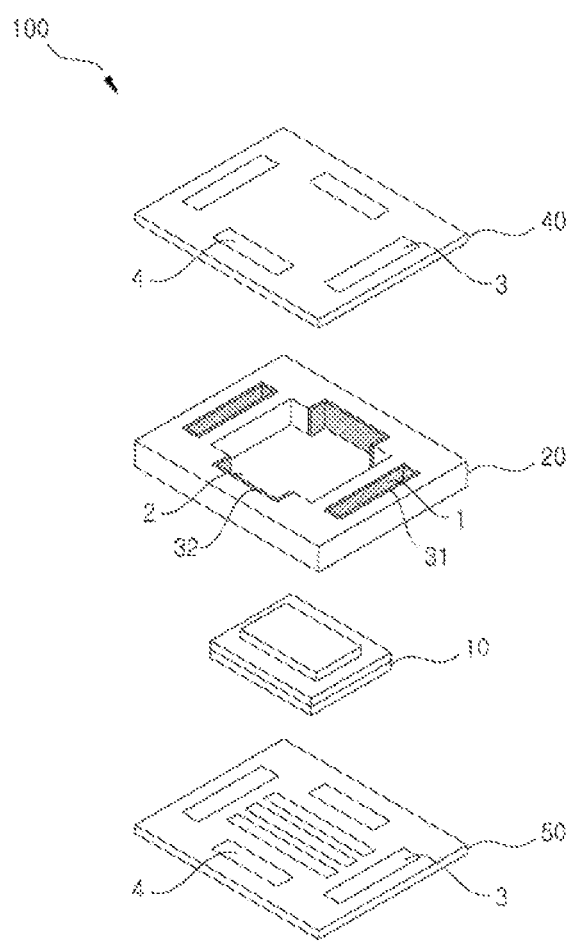

[Figure 2]
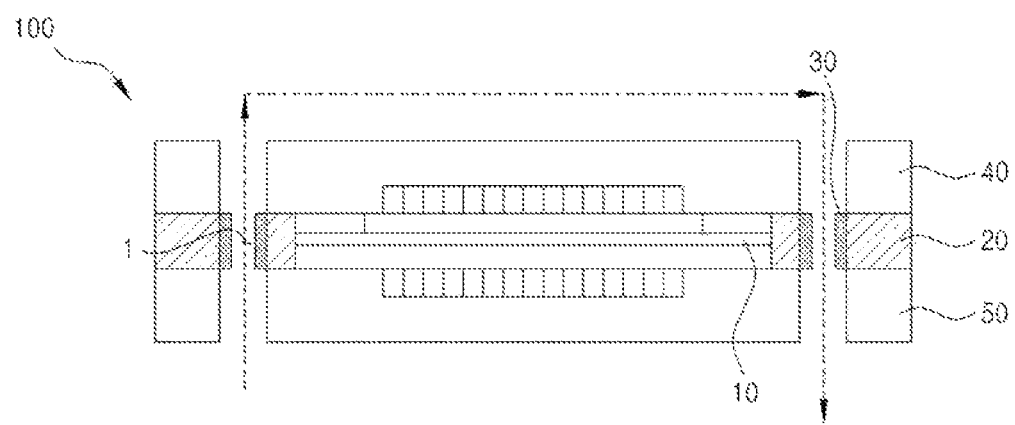

[Figure 3]
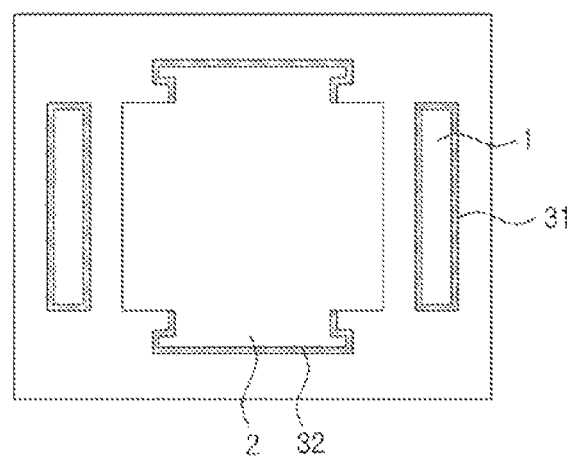

SOLID OXIDE FUEL CELL

TECHNICAL FIELD

This application claims priority to and the benefit of Korean Patent Application No. 10-2016-0103733 filed in the Korean Intellectual Property Office on Aug. 16, 2016, the entire contents of which are incorporated herein by reference.

The present invention relates to a solid oxide fuel cell, and more particularly, to a thin and light solid oxide fuel cell in which a passage through which fuel and air may flow in and out is formed in a sealant layer and a support is located on an inner wall of the passage to prevent the blockage of the passage due to a flowage generated in the sealant layer at a high temperature and a window frame is omitted to simplify a configuration.

BACKGROUND ART

A fuel cell is a device which directly produces electricity through an electrochemical reaction of hydrogen and oxygen in the air, and is an energy source which is eco-friendly, has high energy efficiency, and has high value added through technology development. Specifically, a solid oxide fuel cell which is a third-generation fuel cell does not need a complex external reforming system as compared with other fuel cells, does not use a noble metal electrode catalyst such as platinum, and is not corroded due to a liquid electrolyte, and as a result, the solid oxide fuel cell has advantages in that it is possible to minimize various operating problems caused in a low temperature fuel cell to maintain an operating temperature through appropriate insulation at the time of high temperature operation and to use various fuels.

A configuration of the solid oxide fuel cell is formed of a unit cell including a fuel electrode, an electrolyte, and an air electrode and a connecting material which connects unit cells. Among them, a sealing material has different required conditions depending on an operating condition and a structure of the flat type solid oxide fuel cell so that the sealing material is the most important configuration.

Basic conditions of the sealing material required for a smooth operation of the solid oxide fuel cell are summarized as follows: First, the sealing material needs to be satisfactorily bonded to other components of the solid oxide fuel cell to be in physical contact therewith and a bonded part need not be weakened due to a thermal cycle which is given during an operation of the fuel cell. Second, the sealing material needs to have a low difference in coefficient of thermal expansion from other components so that even though a thermal cycle is given, the sealing material should not be broken due to thermal stress. Third, the sealing material need not be permeated into a porous electrode which is in contact with the sealing material. Fourth, the sealing material needs to be a stable material so that no chemical reaction with other components is caused at a fuel cell operating temperature. Fifth, the sealing material needs to be used without being chemically decomposed and evaporated under two extreme oxygen partial pressure conditions of the fuel and the oxidized gas. Finally, the sealing material needs to have high electrical resistivity at the fuel cell operating temperature, thereby maintaining electrical insulation.

As a composition which satisfies the basic conditions of the sealing material, glass or crystalized glass has been mainly studied and developed. However, the glass and crystalized glass has flowability at a high temperature, so that the glass and crystalized glass may block a passage which is formed in a sealant layer to flow the fuel and reaction gas therethrough.

Therefore, in order to suppress flowability of the sealing material configured in the solid oxide fuel cell of the related art, a material such as fiber or ceramic is included in a glass or crystalized glass composition which configures the sealing material, so that the sealing material may be formed by two or more kinds of compositions. When the sealing material is formed of two or more kinds of materials, if the sealing material is exposed to a high temperature by the operation of the solid oxide fuel cell, there are problems in that long-term durability is reduced and the fuel cell is unstable due to mechanical breakage and a chemical reaction.

Further, ceramic felt or fiber felt is located between two or more sealing materials to improve strength of the solid oxide fuel cell and ensure a structural stability, but there is a problem in that external pressurization is additionally required during all manufacturing processes of the fuel cell such as a heating process, an operating process, a maintaining process, a cooling process, and a commercializing process in addition to pressurization in a sealing process.

DETAILED DESCRIPTION OF THE INVENTION

Technical Problem

The present invention is contrived to solve the above-described problems, and an object of the present invention is to provide a solid oxide fuel cell including a sealant layer which is formed of a single composition to increase long-term durability and stability in a chemical reaction and seal the fuel cell by one compression.

Further, an object of the present invention is to provide a solid oxide fuel cell in which a support is located on an inner wall of a passage formed in a sealant layer to omit a window frame and control a thickness of the sealant layer.

Technical Solution

A solid oxide fuel cell according to the present invention includes: a unit cell; a sealant layer which encloses a periphery of the unit cell; and a plurality of interconnects which is located above and below the sealant layer and has one or more fuel manifolds and one or more gas manifolds, in which in the sealant layer, one or more fuel passages and one or more gas passages are formed, and the sealant layer includes a support which is supported in at least a part of inner sides of the fuel passage and the gas passage.

The support may be formed of ceramics having high electrical resistivity.

Examples of ceramics may include any one or more of silicon nitride ceramics, silicon carbide ceramics, sialon ceramics, alumina ceramics, zirconia ceramics, bio ceramics, titania ceramics, $BaTiO_3$ ceramics, $SrTiO_3$ ceramics, silica ceramics, cordierite ceramics, mica ceramics, SiO ceramics, and $SiAu_4$ ceramics.

The support may be extendable in upper and lower directions.

The support may include: a fuel support located inside the fuel passage; and a gas support located on an inner wall of the gas passage and the fuel support and the gas support may have different shapes.

The fuel support may have a ring shape which encloses an inner side of the fuel passage.

The gas support may have a "U" shape which encloses an inner side of the gas passage.

The sealant layer may be formed of glass or crystalized glass.

A thickness of the sealant layer may be adjusted.

The interconnect may include: an air electrode interconnect in which reaction gas is supplied and a flow passage corresponding to a size of the unit cell is formed; and a fuel electrode interconnect in which fuel is supplied and a flow passage corresponding to a size of the unit cell is formed.

The solid oxide fuel cell may further include: a current collector between the sealant layer and the interconnects.

Advantageous Effects

According to the present invention, the sealant layer is formed of a single composition, so that long-term durability and chemical stability of the fuel cell are increased, and the fuel cell may be sealed only by pressurization during the sealing process, so that the manufacturing process may be simplified and the economic effect may be achieved.

According to the present invention, the support is located on the inner walls of the fuel passage and the gas passage formed in the sealant layer, so that blockage of the fuel passage and the gas passage is prevented due to characteristics of the sealant layer which has flowability at a high temperature, and the unit cell need not be processed.

Further, a window frame may be omitted, a volume and a weight of the solid oxide fuel cell are reduced, and a number of unit cells laminated in one stack structure is increased, so that a high voltage stack structure may be formed.

BRIEF DESCRIPTION OF DRAWINGS

FIG. 1 is an exploded perspective view of a solid oxide fuel cell according to an exemplary embodiment of the present invention.

FIG. 2 is a cross-sectional view of a solid oxide fuel cell according to an exemplary embodiment of the present invention.

FIG. 3 is a cross-sectional view of a sealant layer and a support according to another exemplary embodiment of the present invention.

BEST MODE

The present invention will be described in detail below with reference to the accompanying drawings. Herein, repeated description and the detailed description of publicly-known function and configuration that may make the gist of the present invention unnecessarily ambiguous will be omitted. Exemplary embodiments of the present invention are provided for completely explaining the present invention to those skilled in the art. Accordingly, the shape, the size, etc., of elements in the drawings may be exaggerated for clearer explanation.

Throughout the specification, unless explicitly described to the contrary, the word "comprises" and variations such as "comprises" or "comprising" will be understood to imply the inclusion of stated elements but not the exclusion of any other elements.

Hereinafter, preferred exemplary embodiments will be suggested for better understanding of the present invention. However, the following exemplary embodiments are provided only for better understanding of the present invention, and thus the present invention is not limited thereto.

<Solid Oxide Fuel Cell>

FIG. 1 is an exploded perspective view of a solid oxide fuel cell 100 according to an exemplary embodiment of the present invention and FIG. 2 is a cross-sectional view of the solid oxide fuel cell 100 according to an exemplary embodiment of the present invention. The solid oxide fuel cell 100 according to an exemplary embodiment of the present invention will be described in detail with reference to FIGS. 1 and 2.

The solid oxide fuel cell 100 may include a unit cell 10, a sealant layer 20 which encloses a periphery of the unit cell 10, and a plurality of interconnects 40 and 50 which is located above and below the sealant layer 20 and has one or more fuel manifolds 3 and one or more gas manifolds 4. In the sealant layer 20, one or more fuel passages 1 and one or more gas passages 2 are formed, and the sealant layer includes a support 30 which is supported in at least a part of inner sides of the fuel passage 1 and the gas passage 2.

The unit cell 10 is configured to be a fuel electrode support type in which a fuel electrode serves as a support, and an electrolyte layer may have a size equal to or smaller than that of the fuel electrode. Further, an air electrode is configured to have a size smaller than that of the fuel electrode, and in this case, an area of the fuel electrode is larger than an area of the air electrode so that a fuel electrode polarization resistance may be minimized.

In the fuel electrode support structure, the electrolyte layer may be formed as a thin film having a thickness of 5 to 10 μm so that the sheet resistance of the electrolyte layer may be minimized. Therefore, the solid oxide fuel cell including the fuel electrode support structure may operate at a lower temperature than that of the electrolyte support and air electrode support structures. Further, the fuel electrode and the air electrode are formed to be thick, so that mechanical strength of the solid oxide fuel cell 100 may be increased.

The sealant layer 20 may generally serve as a coupling agent in a fuel cell and also serve as a buffer which lessens an impact applied to the solid oxide fuel cell 100. Further, the sealant layer 20 serves to block an internal space and an external space so that fuel does not leak outside the fuel cell 100, and is coupled to a window frame (or a separator) to serve to prevent the fuel and the reaction gas from being mixed with each other while operating the fuel cell 100.

Further, the sealant layer 20 is formed by enclosing a periphery of the unit cell 10. The sealant layer encloses the periphery of the unit cell 10 by enclosing four sides of the unit cell 10 to serve to lessen an impact applied to the unit cell 10 and seal the unit cell 10 and the plurality of interconnects 40 and 50.

Further, a passage through which fuel and reaction gas flow may be formed, and in the sealant layer 20 according to an exemplary embodiment of the present invention, the one or more fuel passages 1 and the one or more gas passages 2 may be formed.

For example, when the two fuel passages 1 and the two gas passages 2 are formed, the fuel passages 1 may be located at left and right edges of the sealant layer 20 to be opposite to each other, and the gas passages 2 may be located at upper and lower edges of the sealant layer 20 to be opposite to each other. Moreover, when the four fuel passages 1 are formed, two may be located at a left side of the sealant layer 20 and two are formed at a right side of the sealant layer 20. Further, when four gas passages 2 are formed, two may be located at an upper side of the sealant layer 20, and two are located at a lower side of the sealant layer 20. However, it should be noted that the number, a size, and a shape of the fuel passage 1 and the gas passage 2 according to the present invention are not limited thereto.

Further, the fuel passage 1 may be formed to be spaced apart from a seating groove (not illustrated) which is formed in the sealant layer 20 to seat the unit cell, and the gas passage 1 may be formed to be bonded to both sides of the seating groove. The gas passage 2 is formed to be connected to the seating groove, so that the reaction gas which is supplied to the air electrode interconnector 40 may move in a vertical direction from the upper side to the lower side.

Further, the sealant layer 20 may be formed of glass or crystalized glass. Primarily, the sealant layer 20 needs to be sealed and bonded to a material to be bonded and satisfy all physical properties such as a coefficient of thermal expansion and heat resistance. Therefore, a glass or crystalized glass material may be appropriate. As a glass material, any one or more of soda-lime silicates, alkali silicates, alkaline-earth silicate, and alkali borosilicate glass may be included. Further, as the crystalized glass, any one or more of SrO—La2O3-Al2O3-B2O3-SiO2, BaO-Al2O3-SiO2-B2O3, MgO—Al2O3-P2O5, BaO—Al2O3-SiO2-ZnO, and CaO—TiO2-SiO2 based glasses may be included.

The sealant layer 20 is formed of a single composition such as glass or crystalized glass, so that long-term durability and chemical stability of the fuel cell may be increased. Further, the fuel cell 100 may be sealed only by pressurization during a sealing process among manufacturing processes of the solid oxide fuel cell 100, so that the manufacturing processes may be simplified and the economic effect may be achieved.

The support 30 is located at an inner side of the fuel passage 1 and the gas passage 2 formed in the sealant layer 20 to prevent a shape of the sealant layer 20 from being modified or the fuel passage 1 and the gas passage 2 from being blocked, due to a glass or crystalized glass material which has viscosity and flowability at a high temperature. The support may be formed of ceramic having high electrical resistivity.

It should be noted that examples of ceramics having high electrical resistivity include any one or more of silicon nitride ceramics, silicon carbide ceramics, sialon ceramics, alumina ceramics, zirconia ceramics, bio ceramics, titania ceramics, BaTiO3 ceramics, SrTiO3 ceramics, silica ceramics, cordierite ceramics, mica ceramics, SiO ceramics, and SiAu4 ceramics.

Further, it should be noted that the support 30 may include a fuel support 31 located inside the fuel passage 1 and a gas support 32 located on an inner wall of the gas passage 2, and the fuel support 31 and the gas support 32 may have different shapes. More specifically, the fuel support 31 encloses the inner side of the fuel passage 1 to be formed in a ring shape, and the gas support 32 encloses the inner side of the gas passage 2 to be formed in a "U" shape.

FIG. 3 is a cross-sectional view of a sealant layer 20 to which a support 30 according to another exemplary embodiment is coupled. If the gas support 32 encloses the inner side of the gas passage 2, a shape of the gas support 32 is not limited to a "U" shape. The gas passage 2 is in contact with the seating groove to have a shape in which one inner wall is open, so that the gas support 32 located at the inner side of the gas passage 2 and the fuel support 31 may have different shapes.

However, it should be noted that the number, a size, and a shape of the fuel support 31 and the gas support 32 according to the present invention are not limited thereto.

The support 20 may serve as a window frame which prevents the fuel and the reaction gas from being mixed with each other and prevents the fuel or the reaction gas from permeating into the unit cell 10 during the operation of the fuel cell 100, so that the window frame among the configurations of the fuel cell 100 may be omitted. Accordingly, a configuration of the fuel cell 100 may be simplified, a volume and a weight of the solid oxide fuel cell 100 are reduced, and the number of unit cells laminated in one stack structure is increased so that a high voltage stack structure may be formed.

Further, it is possible to prevent the blockage of the fuel passage and the gas passage due to the characteristic of the sealant layer 20 which has flowability at a high temperature. Furthermore, since it is not necessary to perform an additional process to form a through hole in the unit cell 10 for the flowage of fuel and reaction gas in the fuel cell 100, the existing manufacturing device may be used, so that the economic effect may be achieved.

Further, the support 30 may be extendable to upper and lower directions to adjust a thickness. More specifically, since the support 30 has a low strain rate at a high temperature, a thickness of the sealant layer 20 supported by the support 20 may be adjusted by adjusting a height of the support 30, and an amount of sealing material used which configures the sealant layer 20 may be adjusted.

That is, the smaller the thickness of the support 30, the less the amount of the sealing material used, and a weight of the solid oxide fuel cell 100 is reduced by a reduction in elements of the fuel cell 100 and a reduction in amount of sealing material used, so that the energy efficiency may be increased.

The plurality of interconnects 40 and 50 may include the air electrode interconnect 40 in which reaction gas is supplied and a flow passage corresponding to a size of the unit cell 10 is formed, and the fuel electrode interconnect 50 in which fuel is supplied and a flow passage corresponding to a size of the unit cell 10 is formed. Further, it should be noted that the fuel manifold 3 and the gas manifold 4 formed in the air electrode interconnect 40 and the fuel electrode interconnect 50 may be formed at positions corresponding to the fuel passage 1 and the gas passage 2 formed in the sealant layer 20.

When the plurality of solid oxide fuel cells 100 is laminated to form a stack structure, the air electrode interconnect 40 and the fuel electrode interconnect 50 may serve to electrically connect the plurality of laminated unit cells 10, and a flow passage may be formed so that two types of gases which are supplied to the fuel electrode and the air electrode are uniformly supplied to the unit cell 10 without being mixed.

The flow passage formed in the air electrode interconnect 40 and the fuel electrode interconnect 50 may have an uneven structure and formed on any one or more of an upper surface and a lower surface of the air electrode and fuel electrode interconnects 40 and 50. Moreover, it is noted that the flow passage formed in the air electrode interconnect 40 and the flow passage formed in the fuel electrode interconnect 50 are formed to be perpendicular to each other so that the flow passages are not in communication with each other. The air may be supplied through the flow passage formed in the air electrode interconnect 40, and the fuel gas may be supplied through the flow passage formed in the fuel electrode interconnect 50.

The solid oxide fuel cell 100 according to an exemplary embodiment of the present invention may further include a current collector (not illustrated) between the sealant layer 20 and the interconnects. Specifically, an air electrode current collector may be located between the sealant layer 20 and the air electrode interconnect 40, and a fuel electrode current collector may be located between the sealant layer 20 and the fuel electrode interconnect 50.

Generally, the current collector serves to help the fuel electrode or the air electrode to be uniformly and electrically in contact with the air electrode and fuel electrode interconnects 40 and 50. Further, the air electrode current collector is formed using a porous metal plate, a metal mesh, or a conductive ceramic paste, and the fuel electrode current collector is formed mainly using nickel foam.

Since the air electrode and fuel electrode current collectors use the publicly-known technology, a detailed description thereof will be omitted.

The invention claimed is:

1. A solid oxide fuel cell, comprising:
    a unit cell;
    a sealant layer which encloses a periphery of the unit cell; and
    a plurality of interconnects located above and below the sealant layer, each of the plurality of interconnects having one or more fuel manifolds and one or more gas manifolds,
    wherein in the sealant layer, one or more fuel passages and one or more gas passages are formed, and the sealant layer includes a support which is supported in at least a part of inner sides of the one or more fuel passages and the one or more gas passages, and
    wherein the support is made of a material having less flowability than the sealant layer.

2. The solid oxide fuel cell of claim 1, wherein the support is formed of ceramic having a high electrical resistivity.

3. The solid oxide fuel cell of claim 2, wherein the ceramic is one or more selected from the group consisting of silicon nitride ceramics, silicon carbide ceramics, sialon ceramics, alumina ceramics, zirconia ceramics, bio ceramics, titania ceramics, BaTiO3 ceramics, SrTiO3 ceramics, silica ceramics, cordierite ceramics, mica ceramics, SiO ceramics, and SiAu4 ceramics.

4. The solid oxide fuel cell of claim 1, wherein the support is extendable in an upper direction and a lower direction.

5. The solid oxide fuel cell of claim 1, wherein the support includes:
    a fuel support located inside the one or more fuel passages; and
    a gas support located on an inner wall of the one or more gas passages,
    wherein the fuel support and the gas support have different shapes.

6. The solid oxide fuel cell of claim 5, wherein the fuel support encloses the inner side of the fuel passage.

7. The solid oxide fuel cell of claim 5, wherein the gas support encloses the inner side of the gas passage.

8. The solid oxide fuel cell of claim 1, wherein the sealant layer is formed of glass or crystalized glass.

9. The solid oxide fuel cell of claim 1, wherein the interconnects include:
    an air electrode interconnect in which reaction gas is supplied and a flow passage corresponding to a size of the unit cell is formed; and
    a fuel electrode interconnect in which fuel is supplied and a flow passage corresponding to a size of the unit cell is formed.

10. The solid oxide fuel cell of claim 1, further comprising:
    a current collector between the sealant layer and each of the interconnects.

11. The solid oxide fuel cell of claim 2, wherein the sealant layer is formed of glass or crystalized glass.

* * * * *